Figure 1:
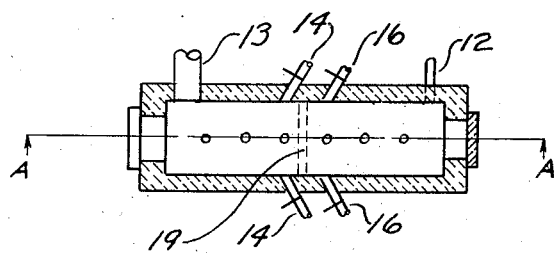

April 18, 1933.   A. E. GREENE   1,904,684
METHOD OF MELTING
Filed July 16, 1931

INVENTOR
BY
ATTORNEY

Patented Apr. 18, 1933

1,904,684

UNITED STATES PATENT OFFICE

ALBERT E. GREENE, OF MEDINA, WASHINGTON

METHOD OF MELTING

Application filed July 16, 1931. Serial No. 551,179.

My present invention relates to metal melting furnaces and more particularly to a method and apparatus for the continuous melting of metal such as iron and steel.

My present invention is a continuation in part of my application Serial Number 34,041, filed June 1, 1925.

One object of my invention is an improved method for the continuous melting of scrap iron or steel, with the aid of electric heat. The continuous melting of metal in combustion heated furnaces has certain disadvantages, particularly the satisfactory control of the temperature of the melted metal at the casting or tapping part of the furnace. This disadvantage is particularly noticeable in smaller types of reverberatory heating furnaces such as air furnaces. This lack of temperature control is partly due to the necessity of admitting considerable amounts of air at a part of the furnace where the highest temperature may be desired, especially in the case where the draft is from the direction of the tapping end toward the charging end. I have found that by the addition of electric heating means at the tapping end, such as arc heating from electrodes to the bath, additional heat may be economically added to the metal and yet the economy of combustion heating may be taken advantage of for preheating the cold or solid scrap charged. In this manner I am able to economically heat the molten metal at the tapping end as much as desired without the necessity of bringing a large bath of metal all up to the tapping temperature.

I have discovered that I can carry out a continuous process of melting cold metal by providing a bath of molten metal in a hearth furnace equipped for electrically heating the hearth chamber, and that cold metal can be charged at one end on the bath and gradually melted and hot molten metal of controlled composition can be regularly tapped from the other end of the chamber, so that a continuous supply of hot molten metal is thus provided by charging cold metal at regular intervals.

Another object of my invention is the melting of small or fine particles of iron or steel or other metal, such as borings and turnings. I have discovered that such small metal can be advantageously melted by charging the small particles of metal mixed with carbonaceous material into a melting chamber on a bath of molten metal therein and heated, first by combustion and then by electric heat, the electric heat being applied near the tapping end of the chamber for the final adjustment of temperature and heat treatment. I have found that the mixing of fine carbonaceous material, such as coal or other form of carbon, with the small metal particles serves to prevent the metal from becoming a mass of partly fused metal which would bridge over or otherwise interrupt the continuous movement of the metal from one end of the furnace to the other. I may, of course, preheat the small metal particles mixed with the carbonaceous material before charging them into the melting furnace, but they are solid and not molten when charged into the melting furnace.

Although my invention may be carried out in different types of furnaces, I prefer to carry it out in an elongated chamber hearth furnace equipped for electric heating of the charge and bath and provided with charging means adjacent one end and tapping means adjacent the other end. In certain modifications of my invention, I provide for combined combustion and electric heating, using combustion heat to do the first part of the heating and melting in the melting chamber and completing the operation under electric heat from electrodes near the tapping end of the chamber.

Figure 2:
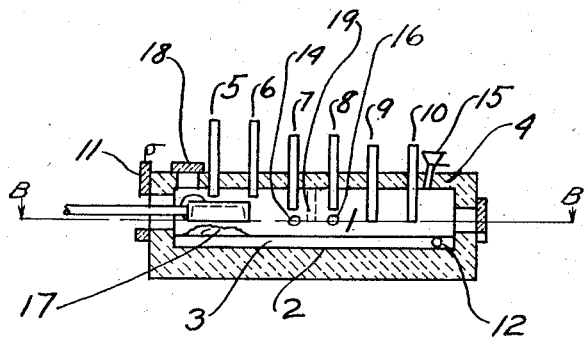

My invention will be better understood from a consideration of the following description in conjunction with the accompanying drawing, in which Fig. 1 is a sectional plan of a furnace in which the process of my invention may be carried out; and Fig. 2 is a sectional elevation of the furnace shown in Fig. 1, taken substantially along the line A—A of Fig. 1.

The furnace illustrated in the drawing comprises a chamber 1 having an elongated hearth 2 on which is shown a bath of molten metal 3. The furnace chamber is covered with a roof 4 provided with openings through which electrodes 5, 6 and 7, and 8, 9 and 10 project vertically. A charge door 11 is provided at one end, and a tap hole 12 is provided at the opposite end. A flue 13 is provided adjacent the charging end for the withdrawal of products of combustion when combustion heating is employed. Openings 14 are provided in the side walls of the furnace for the controlled admission of air, and a passage 15 is provided in the roof for the introduction of solid or gaseous carbonaceous materials. Additional passages 16 are provided in the side walls near the bath for admission of combustible gas which may be subsequently burned by admission of air toward the charging end of the chamber. Extending through the charge door 11, is shown a charge box in up-turned position after having dumped its charge on the molten bath as indicated at 17. Any means for charging may be used, however, and this furnace may be charged through the roof instead of or as well as through the charge door indicated. A roof charging opening and a cover therefor are indicated at 18.

The furnace chamber is equipped with electrodes of which I have shown six. Any suitable number of the electrodes may be employed simultaneously. I have shown the electrodes arranged in sets of three to provide for the operation of two separate three-phase heating systems. Such an arrangement will permit the use of all of the electrodes simultaneously or only three adjacent either end. I may operate any three of the six electrodes simultaneously in a single system. The electrodes are arranged for operation and regulation in any well known manner, such as by means of automatically controlled motors for raising and lowering them to maintain regulated current through the arcs.

The apparatus may be equipped for continuous charging by means of a movable floor or continuous chain mechanism for conveying cold scrap to the charging opening into the melting chamber. However, my apparatus may also be operated by charging at regular intervals so that melting is practically continuous and so that a continuous supply of hot molten metal, such as cast iron or steel, is provided at the tapping end of the furnace.

The process of my invention is preferably initiated by providing a molten metal bath in the melting chamber. This may be provided either by charging cold scrap and melting it or by pouring molten metal into the hearth to provide a bath the full length. After the bath is provided, either just enough to provide a bath the full length or else a full charge of molten metal, charging and tapping may be started and continued at regular intervals. If a full bath has been provided, tapping may be commenced and a given amount of metal removed from the furnace. At the same time, or at approximately the same time, cold metal may be introduced at the charging end and melted into the bath. The provision of a large bath makes it possible to regulate the temperature and composition of the metal so that it may be tapped within close limits of temperature and composition. Any adjustment of composition may be quickly made by the addition of the proper metal nearer the tapping end. However, the metal charge is preferably selected to give the desired mixture, much as is done in a cupola, except that melting takes place gradually on the molten bath and withdrawal of finished metal takes place at the tapping end.

I have indicated in dotted lines at 19, a refractory wall which may be used in a modified method of practicing this invention so as to separate the electric heating chamber from the other end of the furnace.

I may also operate this process by charging carbonaceous material such as coal near the electrodes and then burning the volatile matter and carbon by admission of air farther down and away from the tapping end and the electrodes. Or I may admit gas near the electrode heating at the tapping end, and withdraw the electrodes at the farther end so as to heat the entering charge first by combustion and subsequently by electric heat.

In melting small scrap and especially borings and turnings I find that by the addition of a percentage of carbonaceous material with the borings, melting is aided and bridging of the charge is avoided.

My process is especially applicable for production of cast iron in large tonnages and continuously. My process may be carried out so as to tap the metal continuously rather than at intervals.

The advantages of my improved method include less loss of metal by oxidation, better control of composition, freedom from sulphur pick-up, better temperature control and increased efficiency.

What I claim is:

1. The method of continuously melting cold metal which consists in providing a relatively large bath of molten metal in a melting chamber heated electrically near its tapping end, charging cold metal at the other end, heating the cold metal on the molten bath by combustion heat and subsequently by electric heat, and, while maintaining a supply of molten metal, tapping metal at a regular rate at the tapping end.

2. The method of melting iron or steel which comprises maintaining a molten bath of metal on the hearth of a furnace provided with a charging opening and a tapping outlet at a point remote from the charge opening, introducing the metal to be melted through the charge opening on the molten bath, heating the charge by combustion heat applied near the charging opening and causing it to melt, and then further heating the molten metal electrically near the tapping outlet, and maintaining a continuous supply of molten metal at suitable casting temperature.

3. The method of melting iron or steel which method comprises providing an elongated melting chamber having electric heating means near the tapping end and means for heating by combustion in the opposite end of the chamber, providing a molten bath of metal in said chamber, charging unmelted metal at the charging end at regular intervals on the molten bath, causing the metal to become molten before it reaches the tapping end, heating the melted metal near the tapping end by means of arcs in the presence of carbonaceous material on the bath near the arcs, and maintaining a continuous supply of hot molten metal at the tapping end.

4. The method of melting iron or steel which comprises maintaining a molten metal bath on the hearth of a furnace provided with a charging inlet and a tapping outlet for molten metal at a point remote from said charging inlet, introducing solid, that is, unfused metal onto the molten bath through the charging inlet, heating the charge by combustion at the charging end and heating the melted metal electrically near the tapping outlet, maintaining continuously a bath of metal on the furnace hearth while charging unfused metal at the charge end and while tapping heated molten metal at the tapping end, and tapping molten metal from the furnace at substantially the rate of introduction of unfused metal at the charging end, and thus maintaining a substantially constant volume of bath.

5. The method of melting iron or steel, such as turnings, borings or the like, said method comprising maintaining a bath of molten metal on the hearth of a furnace provided with a charging inlet and having a tapping outlet at a point remote from said charging inlet, introducing through said charge inlet onto the molten bath a mixture of small particles of metal and solid carbonaceous material in quantity sufficient to prevent bridging over of the charge, heating the charge by means of combustion heat near the charge inlet and heating the melted metal near the tapping outlet by means of electric heat, thus causing the charge to gradually move through the chamber and maintaining a continuous supply of heated molten metal of adjusted composition and temperature.

6. The method of continuously melting and continuously tapping melted metal, said method consisting in maintaining a molten bath of metal on the hearth of a furnace having a charging inlet and having a tapping outlet at a point remote from said charging inlet charging metal at a substantially regular rate at the charging inlet onto the molten bath, heating it by combustion near the charge inlet end of the furnace, heating the molten metal electrically prior to tapping it, and while maintaining a substantially constant amount of molten metal, tapping the electrically heated metal in a continuous stream from the tapping outlet.

7. The method of melting iron or steel, said method comprising maintaining a molten bath of metal in an elongated furnace chamber provided with combustion heating means and having electric heating means for heating the molten metal near the tapping end of the chamber, charging unmelted metal on the bath at the charge end, heating this part of the chamber by the combustion of gas therein, maintaining a molten bath continuously, and finishing the metal by heating it electrically at the tapping end and tapping the electrically heated metal at a substantially uniform rate.

In testimony whereof I affix my signature.

ALBERT E. GREENE.